UNITED STATES PATENT OFFICE.

JOHN L. KIDWELL, OF GEORGETOWN, DISTRICT OF COLUMBIA.

IMPROVED COMPOSITION FOR DISINFECTING AND PURIFYING HOSPITALS, CAMPS, &c.

Specification forming part of Letters Patent No. 38,748, dated June 2, 1863.

*To all whom it may concern:*

Be it known that I, JOHN L. KIDWELL, of Georgetown, in the county of Washington, District of Columbia, have invented certain new and useful compounds or compositions of matter to be used as disinfecting, deodorizing, and antiseptic agents; and I do hereby declare the following to be a description of the materials used, and a full and clear statement of the mode of combining them to produce the said compounds or compositions of matter, and the mode of using these for the purposes contemplated.

The nature of my invention consists in producing certain disinfecting, deodorizing, and antiseptic compounds by the combination of certain well-known materials, the said compounds or compositions of matter being intended to be used to prevent or greatly lessen the effect of decomposing animal or vegetable matter in the production of endemic, epidemic, or contagious diseases; to prevent or destroy offensive odors arising from such decomposition or other causes, and, finally, to prevent or greatly retard animal and vegetable decomposition.

To enable others skilled in the art to understand, prepare, and use these compositions of matter or compounds, I will proceed to describe he materials of which they are composed, the manner and proportions in which they are to be combined, and state several of the most important uses to which they may be applied.

The materials used in the preparation of my compounds are sulphate of lime, sulphate of magnesia, sulphate of copper, and charcoal, each reduced to a powder or finely granulated. The two first-named, when combined in about the proportions, by weight, of one hundred and fifty parts sulphate of lime, one hundred parts sulphate of magnesia, produce an excellent and cheap antiseptic and deodorizer, extremely well adapted to the preservation of human bodies for transportation, as it will preserve such bodies for many days, even in summer, free from offensive odor, and will not discolor the skin when placed directly in contact with it. It may also be used on this account on the floor, furniture, &c., of hospitals, sick-chambers, and the like, and for the preservation of fresh meats from the rapid decomposition to which they are exposed in hot and moist weather or climates. I find, however, that combining sulphate of copper with the two preceding sulphates, in about the following proportions, by weight, one hundred and fifty parts sulphate of lime, one hundred parts sulphate of magnesia, ten parts sulphate of copper, a still more powerful composition is obtained. Sulphate of copper is a well-known antiseptic salt, but alone its cost would in most instances render its use objectionable where large quantities would be required. Combined, as here proposed, with cheaper materials of equivalent properties, it may be used for camps, cess-pools, outhouses, to great advantage practically, and at a very moderate increase of expense. With these materials I sometimes combine charcoal or coal-tar in about the following proportions by weight: one hundred and fifty parts sulphate of lime, one hundred parts sulphate of magnesia, ten parts sulphate of copper, ten parts charcoal or coal-tar, and sometimes I leave out the copper salt entirely, combining only the earthy salts with the charcoal or coal-tar, and sometimes even combine only one of these salts with the charcoal or coal-tar. This is particularly the case where the greatest economy is desirable and no objection exists to the color resulting from charcoal or coal tar, or to the smell of the latter—as, for instance, in stables, dung-piles, pits for dead animals, water-closets, &c. In many of these cases I find coal-tar a valuable substitute for charcoal.

It will be observed that all the materials used in these compositions, except coal-tar, which is only resorted to under particular circumstances, are dry powders and perfectly inodorous alone or in combination, and not subject to decomposition or alteration by contact or by the influence of the atmosphere. They may therefore be prepared and transported to the most remote places with safety in any ordinary form of package.

Although the extensive tests to which I have applied these compositions satisfy me that the proportions herein given are about the best that can be used, I do not confine myself to them, as greater or less alteration in the proportions of one or more of them may be made without affecting to a material extent the nature of the invention.

I am aware the sulphites of lime and magnesia have been proposed and used separately and in combination for disinfecting purposes.

These are doubtless valuable agents for this purpose, but they are essentially, economically, and chemically different from the sulphates which I propose. The sulphites require careful and special preparation: The sulphates are common articles of trade, to be had in every apothecary or drug store. They may produce the same chemical and sensible effects as disinfectants and deodorizers; but if they do, which I doubt, still the use of the cheap common article, accessible at all times and in all places, is a valuable improvement on the other, which is costly and only to be had under peculiar circumstances and in few places.

Having thus fully set forth therefore the nature of my invention, what I claim therein, and desire to secure by Letters Patent of the United States, is the following, to wit:

1. The combination of sulphate of lime with the sulphate of magnesia, as set forth, for the production of a disinfecting, deodorizing, and antiseptic compound or composition of matter.

2. The combination of sulphate of lime and sulphate of magnesia with sulphate of copper, charcoal, and coal-tar, or either one or more of them, substantially as set forth.

JNO. L. KIDWELL.

Witnesses:
 ROBERT PETTIT,
 JENKIN THOMAS.